Oct. 23, 1962
G. F. PARRIS
3,060,278
DICTATING MACHINE
Filed Aug. 7, 1957
6 Sheets-Sheet 1
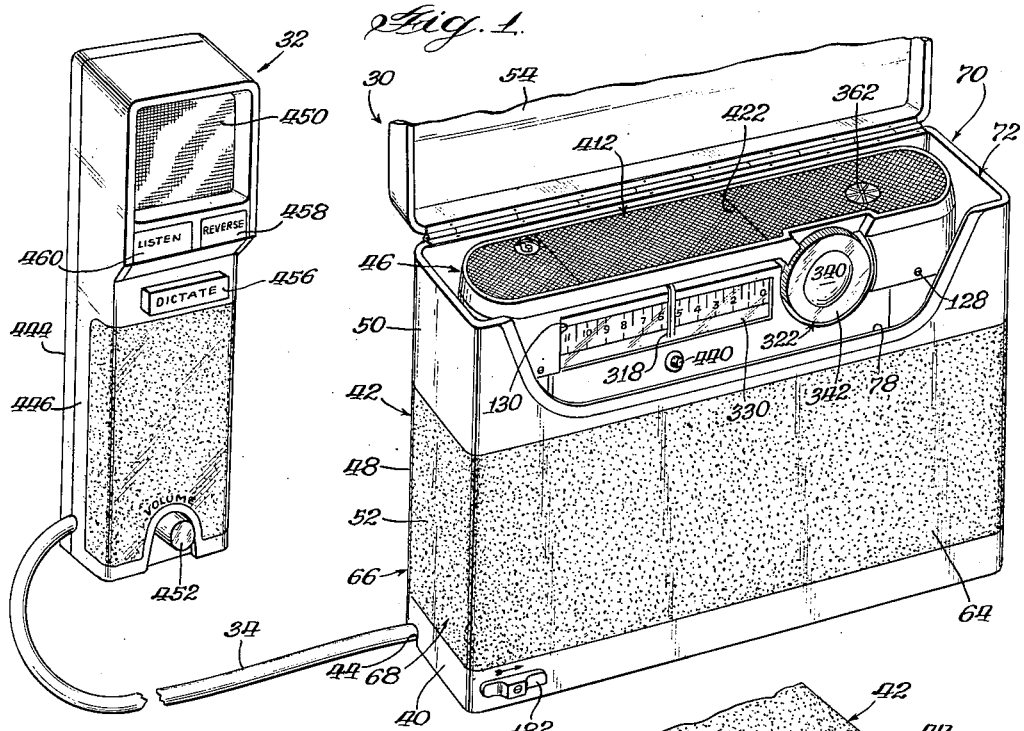
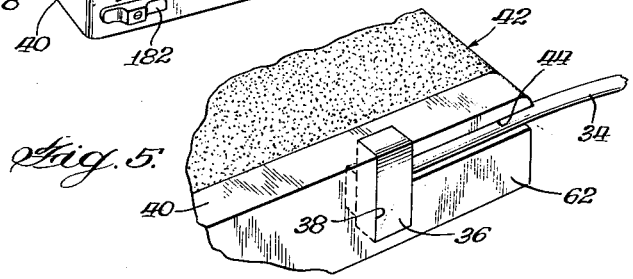
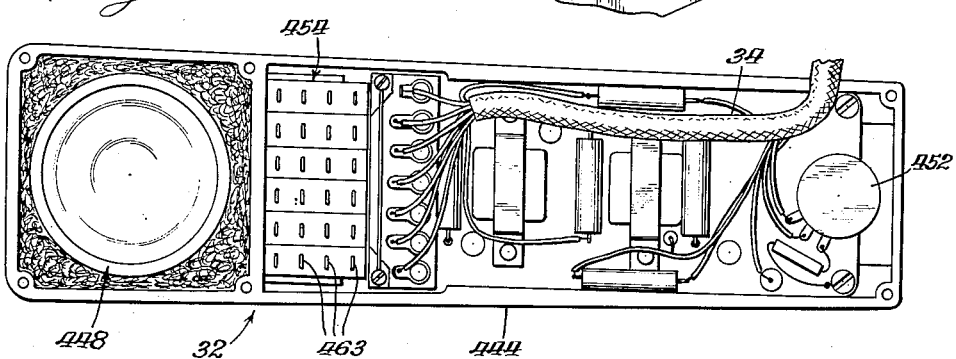
Inventor
George F. Parris
By Horton, Davis,
Brewer & Brugman
Attys Oct. 23, 1962
G. F. PARRIS
3,060,278
DICTATING MACHINE
Filed Aug. 7, 1957
6 Sheets-Sheet 2
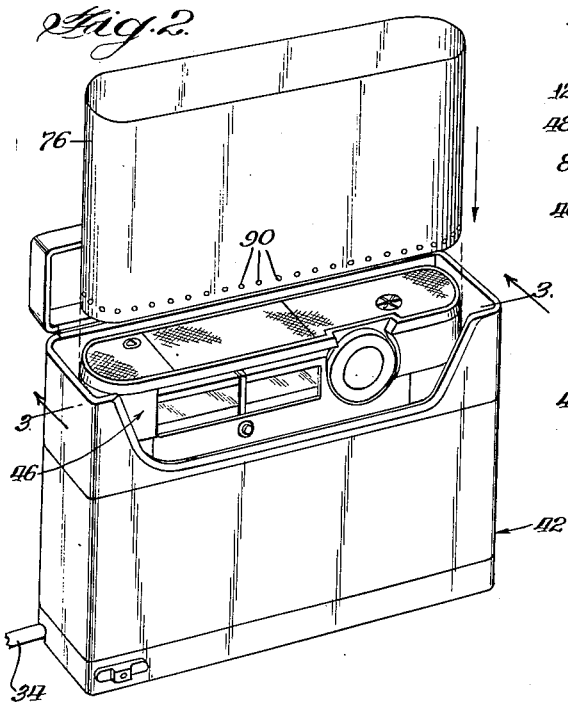
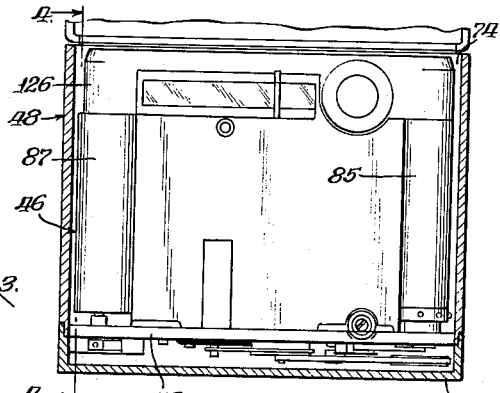
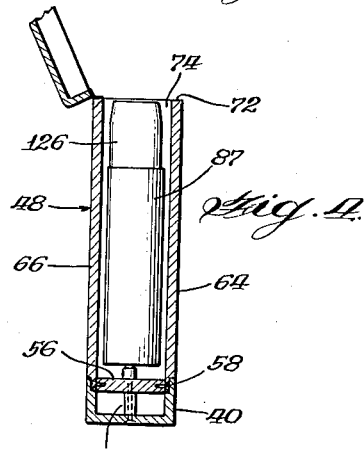
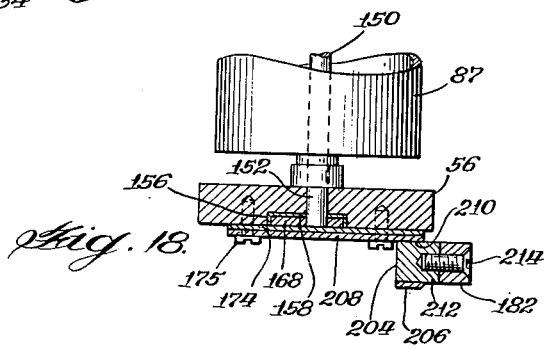
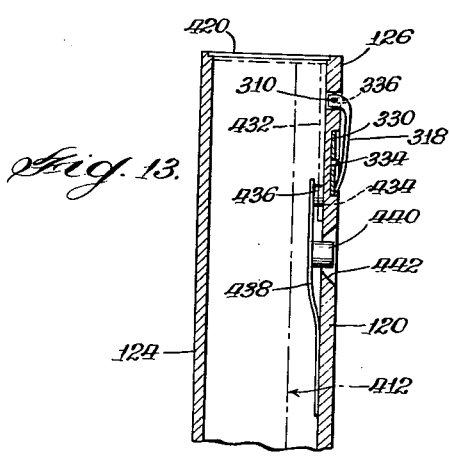
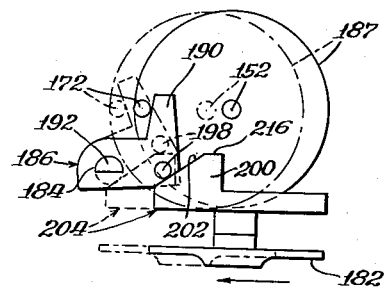
INVENTOR.
George F. Parris
BY Horton, Davis,
Brewer + Brugman
Attys.

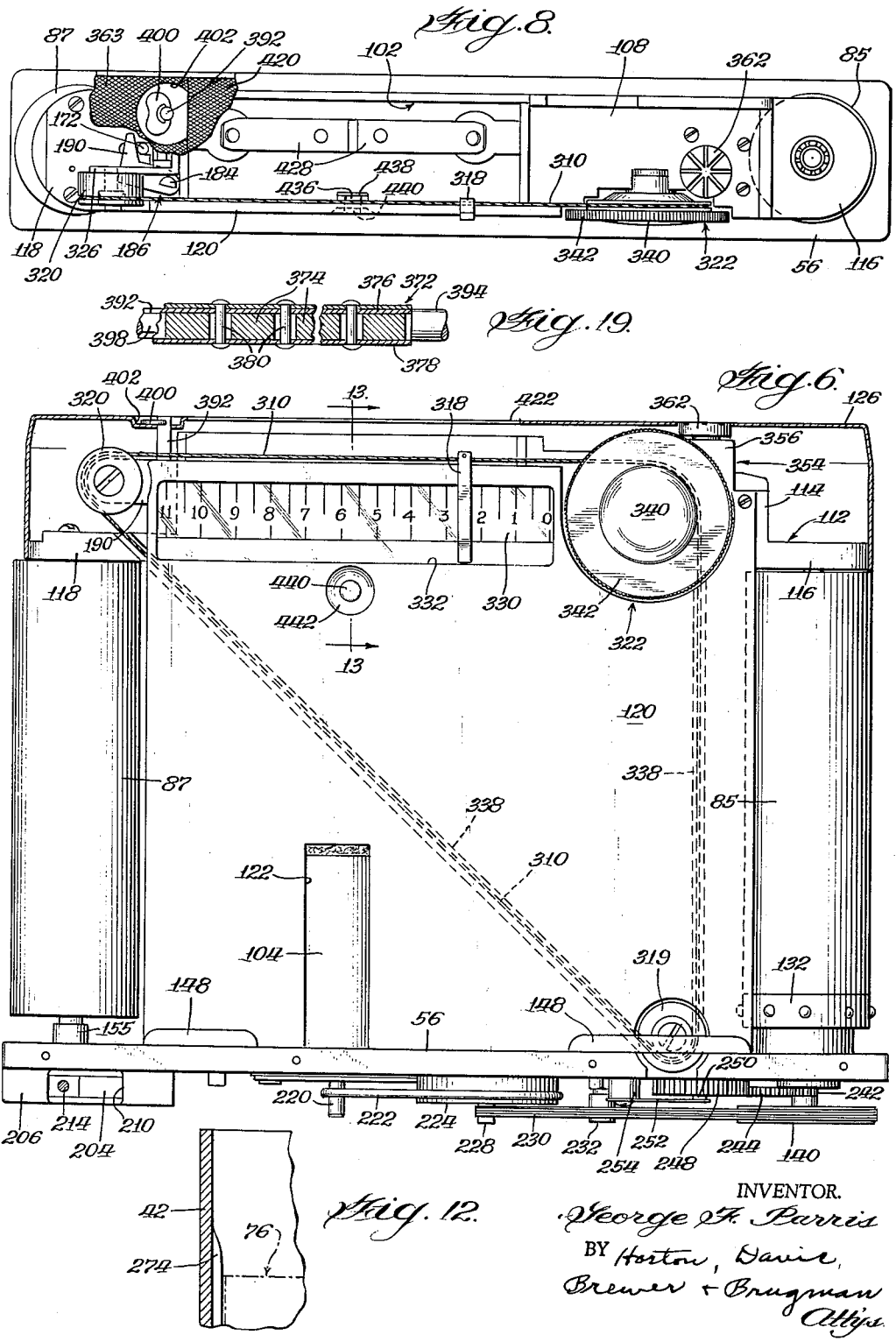

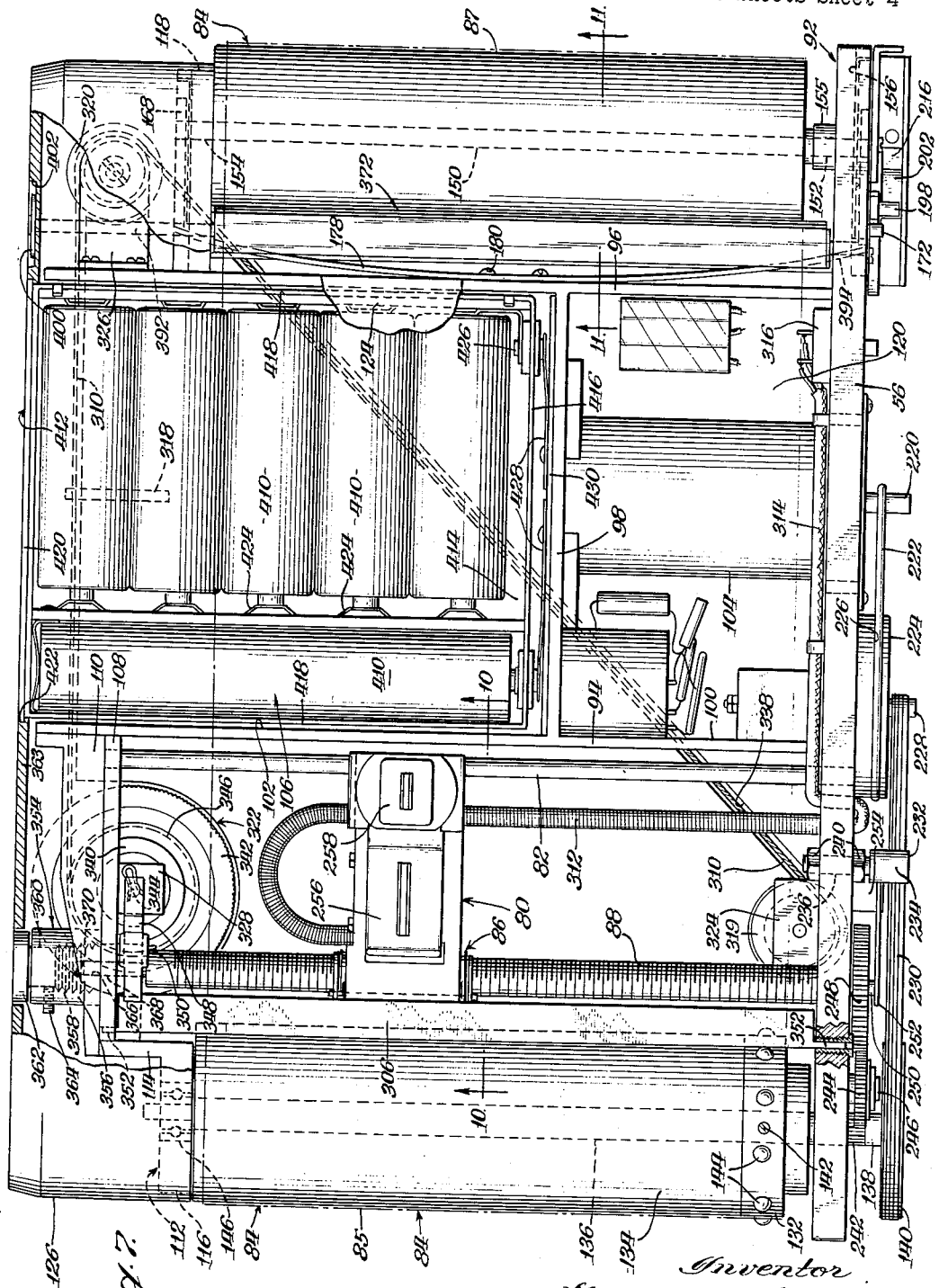

Oct. 23, 1962
G. F. PARRIS
3,060,278
DICTATING MACHINE
Filed Aug. 7, 1957
6 Sheets-Sheet 5
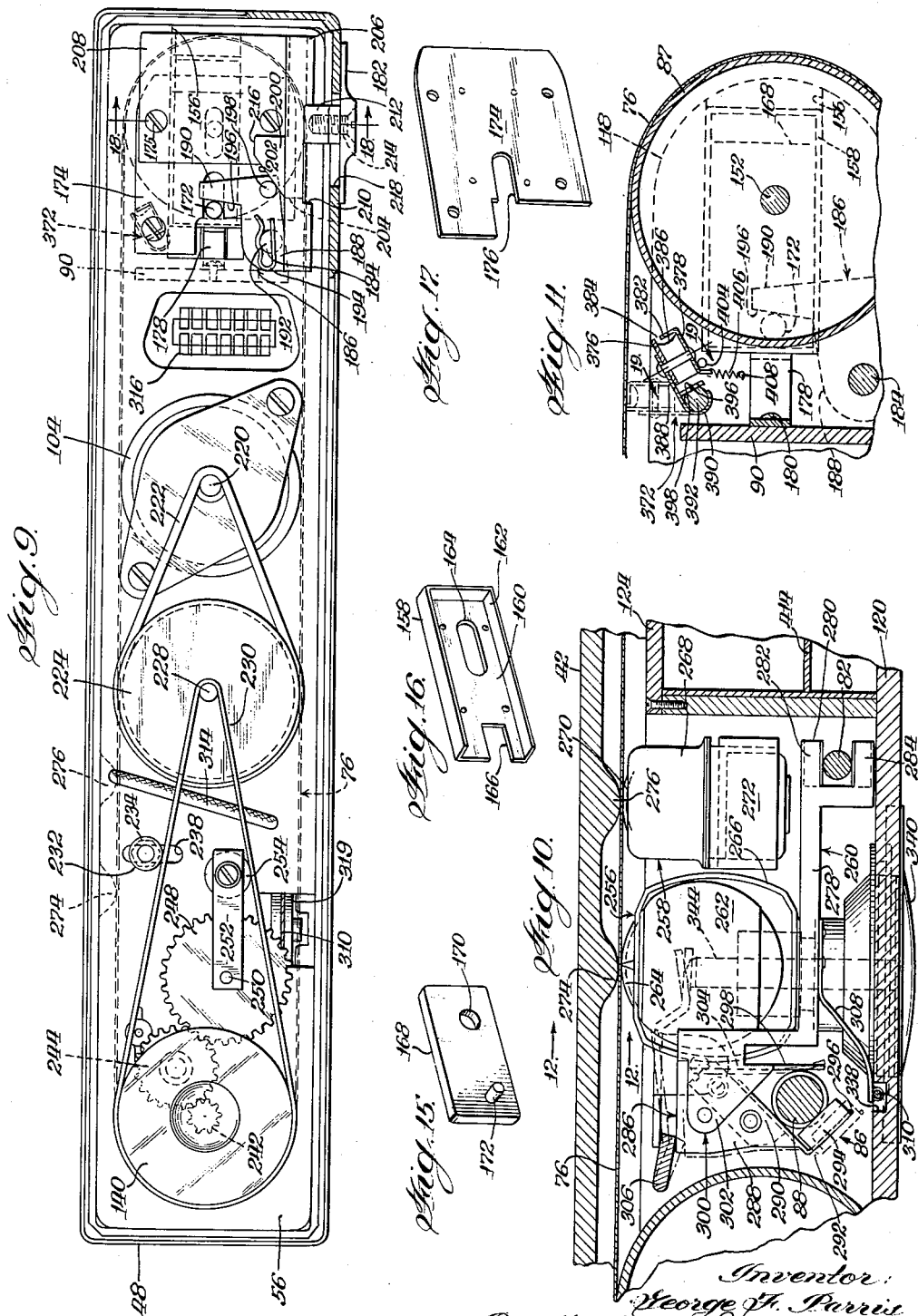

Oct. 23, 1962 G. F. PARRIS 3,060,273
DICTATING MACHINE
Filed Aug. 7, 1957 6 Sheets-Sheet 6

Inventor:
George F. Parris
By Horton, Davis,
Brewer + Brugman
Attys.

United States Patent Office 3,060,278
Patented Oct. 23, 1962

3,060,278
DICTATING MACHINE
George F. Parris, Algonquin, Ill., assignor, by mesne assignments, to Victor Comptometer Corporation, Chicago, Ill., a corporation of Illinois
Filed Aug. 7, 1957, Ser. No. 676,841
17 Claims. (Cl. 179—100.2)

The present invention relates to dictating machines.

The machine of the present invention is a recording and reproducing machine, being capable of recording signals and of reproducing them, and it is intended that it be regarded as such in its broad aspects. However, due to special features of the machine disclosed herein embodying the invention, it is specially adapted to dictation purposes, and for the sake of simplicity and convenience, it will be referred to herein as a dictating machine.

The invention is well adapted to a magnetic type machine, although it is not limited thereto. Such a magnectic type machine utilizes a record medium having a magnetizable material on a surface thereof which is magnetized by a transducer in response to signals formed by sound impulses, such as of the voice, impinging on an appropriate control means, such as a microphone. The record medium is then utilized in a reproducing operation, as for transcribing the recorded material, in a suitable machine which may be the same machine in which the dictating operation was performed, or another machine. Preferably, and as illustrated herein, the record medium is in the form of an endless belt.

A broad object is to provide a novel dictating machine of the foregoing general character.

Another and primary object is to provide a machine of the foregoing character that is extremely small and compact and thus well suited to portability.

A further object is to provide an electrically operated and controlled dictating machine having a self-contained power plant, to the end of enhancing portability, and enabling its use away from a permanent electric source, found in the office or home, such as in travel as in an automobile, or in other places where an electric source is not readily or practically accessible.

Still another object is to provide a dictating machine of the foregoing character in which the operating and control elements are arranged in a novel manner whereby to enable the use of a record medium or belt of large size such as is used in a much larger, or relatively non-portable, machine, and thus to enable use of the same belts interchangeably in the machine of the present invention and such larger machine.

Another and more specific object is to provide a dictating machine of the immediately foregoing kind, in which the operating and control elements are arranged in a compact manner, with the belt in surrounding relation to all, or substantially all, of such elements, the assembly thus formed, however, being enclosed or encased by a suitable protective casing.

A further object is to provide a dictating machine having operating and control elements arranged within the space surrounded by the record medium or belt, in which the chassis containing the foregoing is contained substantially within an enclosing casing, wherein a novel arrangement is provided for rendering the control elements accessible to the exterior for necessary manipulation.

Still another object is to provide a dictating machine for use with a belt record medium having a magnetizable material on a surface thereof, and a transducer for magnetizing the magnetizable material, in which the magnetizable material is on the inner surface of the belt and the transducer is contained entirely within the space surrounded by the belt.

Another object is to provide a dictating machine utilizing a belt record medium and having a transducer for producing recordation on the belt, and means for driving the belt in a linear direction and the transducer in direction transversely of the belt, including interconnecting means for effecting predetermined relative rate of speed therebetween, and externally accessible manually operated means for releasing the interconnecting means and moving the transducer independently of the belt.

A still further object is to provide a dictating machine utilizing a magnetizable record medium, and a magnetic erasing means of novel character both as to construction and manner of operating it.

Another object is to provide a dictating machine of the kind using a belt record medium and having rolls for mounting the record medium, including a novel arrangement for biasing the rolls relatively apart for frictionally retaining the belt thereon and manipulable means for moving the rolls relatively toward each other to facilitate placement of the belt on, and removal from, the rolls.

A further object is to provide a dictating machine of the general character stated having rolls for supporting a belt record medium, in which one of he rolls is a driving roll and is made up of a driving hub portion and a main portion freely rotatable relative to the hub portion, and the hub portion and belt having interlocking formations, whereby to facilitate inter-engagement of the formations in response to rotation of the hub portion.

Another object is to provide a dictating machine including a machine unit and a microphone uint, electrically but detachably interconnected, and having a magnetizable record medium and operating parts all contained in the machine unit, and electrical controls and appurtenances such as switches, microphone, speaker, amplifier, and volume control, in the microphone unit.

Other objects and advantages of the invention will appear from the following detailed description taken in conjunction with the accompanying drawings, in which:

FIGURE 1 is a perspective view of a machine embodying the features of the present invention;

FIG. 2 is an illustration, in perspective, of the machine unit, or main portion of the machine, showing the manner in which the record medium is inserted in and removed from the machine;

FIG. 3 is a semi-diagramamtic view, in section, taken approximately on the vertical longitudinal plane indicated at the line 3—3 of FIG. 2;

FIG. 4 is a semi-diagrammatic view taken on a vertical transverse plane at approximately the line 4—4 of FIG. 3;

FIG. 5 is a detail perspective view, from the under side of the machine unit;

FIG. 6 is a front elevational view of the chassis of the machine, removed from the casing, oriented according to the position of FIG. 3, and with portions broken away;

FIG. 7 is a rear elevational view of the chassis, removed from the casing, from the side opposite that of FIG. 6, and with portions broken away;

FIG. 8 is a plan view of the chassis, as viewed from the top of FIG. 6, with portions broken away;

FIG. 9 is a bottom view of the machine unit, with the bottom element of the casing removed and exposing the adjacent portions of the chassis;

FIG. 10 is a detail sectional view taken on line 10—10 of FIG. 7, and with a portion of the casing included;

FIG. 11 is a detail sectional view taken on line 11—11 of FIG. 7;

FIG. 12 is a fragmentary sectional view taken on line 12—12 of FIG. 10;

FIG. 13 is a sectional view taken on line 13—13 of FIG. 6;

FIG. 14 is a view oriented according to FIG. 9 and showing certain of the elements at the right-hand end of FIG. 9;

FIG. 15 is a perspective view of one of the elements included in the assembly shown at the right-hand end of FIG. 9;

FIG. 16 is a perspective view of another one of the elements shown in the assembly just referred to;

FIG. 17 is a perspective view of another element shown in the assembly just referred to;

FIG. 18 is a detail sectional view taken on line 18—18 of FIG. 9;

FIG. 19 is a view taken approximately on line 19—19 of FIG. 11, this figure being a longitudinal sectional view of the erasing bar;

FIG. 20 is a view of the interior of the microphone unit, or hand piece, of FIG. 1, i.e., the unit shown at the left of FIG. 1;

Figure 21:
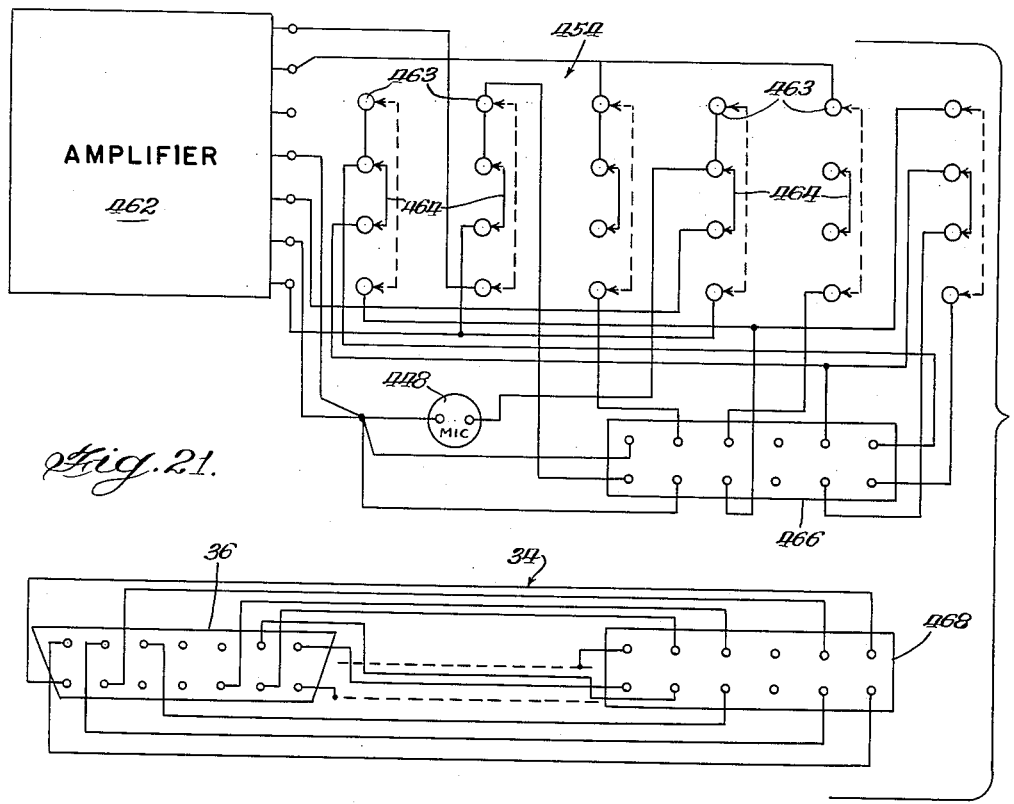
FIG. 21 is a diagram of an electrical circuit utilized in the machine.

Referring now in detail to the drawings, attention is directed first to FIG. 1 showing the new dictating machine of the present invention in its entirety. The machine includes a machine unit, or main part, 30 and a microphone unit or hand piece, 32 interconnected by an electric cable 34. The cable 34 is detachably secured to one or both of the units and preferably at least the machine unit 30 for quick detachment therefrom to facilitate handling the two units, as in inserting them in a carrying case, in keeping with the portable nature of the machine. FIG. 5 illustrates a quick detachable connection which includes a plug 36 secured to the cable 34 which is fitted in the recess 38 in the under surface of the machine unit 30. The under surface is provided by a bottom closure element 40 forming a portion of the casing 42 of the machine, and detachably secured to the other portion, as will be explained more fully hereinbelow. Leading from the recess 38 is a groove 44 receiving the adjacent portion of the cable 34 whereby the plug 36 and adjacent portion of the cable are contained entirely within the outer confines of the closure element 40 so that the machine unit may readily be stood upright on its under surface, as represented in FIG. 1. Preferably the plug 36 and recess 38 are so relatively dimensioned and complementally shaped that the plug fills the recess and provides a surface flush with the remaining surface of the bottom closure element 40.

The unit 30 of the dictating machine includes in addition to the casing 42 an internal part or chassis 46 which includes most of the operating parts of the machine not included in the unit 32. The casing 42 includes a surrounding wall member 48 which may be of any suitable material and in the present instance preferably includes a metal base member 50 and a partial covering material 52 of leather or leather-like material surrounding the metal member 50. The surrounding wall member 48 is open at the bottom and normally is closed by the detachable closure member 40 referred to above. The casing or wall member 48 may be open at the top, either permanently or temporarily when the machine is in use, being at other times closed by a suitable cover 54 of any desired character.

The means for connecting the bottom closure member 40 with the wall member 48 is indicated in FIGS. 3 and 4. The wall member 48 is secured to a base plate 56 which forms the main frame member of the chassis 46 and the means by which the chassis is mounted in the casing. In the assembly of the casing and chassis, the base plate 56 is positioned adjacent the lower edge of the wall member 48 and is secured thereto by suitable means such as screws 58. The bottom closure member 40 is appropriately dimensioned and shaped to fit to the wall member 48 and to enclose certain operating members mounted on the underside of the base plate 56, as will be explained more in detail hereinbelow. The bottom closure member 40 may be secured in place by suitable means such as screws 60 inserted through holes in the bottom closure member and the base plate 56.

FIG. 1 illustrates the machine 30 in what is a preferred position in the normal use thereof. Although the machine may be used in any position thereof, i.e., whether standing, lying, or in other positions, in keeping with the portable nature thereof, the following detailed description will be in reference to the machine unit 30 as being oriented according to FIG. 1, with the understanding that the invention is not to be limited because of such specific reference to its position, but that in other positions of the machine, relation of the various parts thereof will be interpreted according to such different positions. Referring, however, to the machine as positioned as shown in FIG. 1, and for the sake of convenience, the machine unit will be referred to as having a bottom surface 62 formed by the bottom closure member 40, a front side 64, a rear side 66, a left end 68, a right end 70, and a top side 72.

The base plate 56 is dimensioned to closely fit the inner surfaces of the wall member 48 of the casing, being thus dimensioned according to the internal transverse dimensions of the wall member. The portions of the chassis 46 above the base plate 56 are all contained within a space slightly smaller than the space determined by the inner surfaces of the wall member 48, thus forming an annular or peripheral space 74 entirely surrounding the upper portion of the chassis for receiving a record medium 76 (FIG. 2) which is in the form of an endless belt and will be referred to again more in detail hereinbelow. The belt, when inserted in the space 74, thus is disposed closely adjacent the inner surfaces of the wall member 48 and entirely surrounds all portions of the chassis 46 that are disposed above the base plate 56. The belt record member 76 is easily inserted into the space 74, and for removing the belt, an upper edge thereof may be grasped by the fingers, this action being facilitated by the cut-out portion 78 formed in the front side 64 of the casing 42.

The present invention is shown as being embodied in a magnetic type dictating machine. The belt record medium 76 is provided with a material furnishing a magnetizable surface for cooperation with a magnetic transducer, fully explained hereinbelow. The dictating machine is extremely small and compact, as stated above, but nevertheless is adapted to the use of a belt record medium 76 of a relatively large size, and of a size that may be utilized in a large dictating machine, or recording machine, that is generally not recognized as being portable. Such type of dictating or recording machine is shown in copending United States Letters Patent application of Alfred E. Lorenz, Serial No. 408,907, filed February 8, 1954, now Patent No. 2,926,920, issued March 1, 1960, and application of Richard E. Trost, Serial No. 635,295, filed January 22, 1957, and assigned to the assignee of the present invention. It will be understood, however, by those skilled in the art that the invention is not limited to a magnetic type dictating machine, but may be embodied to advantage in various types of dictating machines. The kind of machine of the general class including the machine of the two above-mentioned copending applications, and that illustrated in the present application, usually comprises (see particularly FIG. 7) a transducer head 80, a rod or other suitable support 82 therefor, a drivable carrier 84 including rolls 85 and 87 for removably carrying and driving the belt record medium 76, and a head-traversing drive connection 86 including a rotatable threaded shaft or feed screw 88. In such a dictating machine the head 80 is mounted on the rod 82 for sliding movement along the rod and for limited pivotal movement thereon and sliding movement in directions transverse to the rod. The head 80 is thus mounted for cooperation with the belt record medium 76 on the carrier 84, as well as being movable into and out of a position of driving engagement with the feed screw 88, and when it is in such position it is movable by the head-traversing drive connection 86 along the support 82 to traverse the record medium 76 for recording or reproducing signals thereon. When the head is out of the position just mentioned, it is manually reciprocable along the support 82, independently of the drive connection mentioned, to position the head for a subsequent traversing of all or a portion of the record medium.

The belt record medium 76, as indicated, is continuous or endless and is of substantial width relative to its linear dimension. Adjacent one edge is a series of apertures 90 for reception of drive teeth or projections, to be referred to again hereinbelow, on the carrier 84. The record medium includes a body of any suitable material such as a plastic material, and the coating of magnetizable material referred to above is on the inner surface of the record medium, and thus positioned for engagement, or substantial engagement, by the transducer head 80 which is within the path defined by the record medium.

The chassis 46 includes a rigid frame on which the operating parts of the chassis are mounted. Attention is directed particularly to FIGS. 6 and 7 for illustration of this frame. The frame indicated in its entirety at 92 includes the base plate 56 referred to above as the main element and mounting means thereof. The base plate 56 serves as a means for securing the chassis in the casing, i.e., for securing the chassis and casing together. The base plate 56 is dimensioned and shaped as indicated above, complementally to the transverse dimensions and shape of the casing, and is a flat plate without special conformation except openings and apertures for mounting the various elements thereto. The plate, as well as the other members making up the rigid frame, may be of any suitable material, preferably a lightweight metal. The parts making up the frame are secured together by suitable means such as by screws and are secured together in a semi-permanent condition, intended normally not to be disassembled.

Upstanding from the base plate 56 are a pair of vertical transverse plates 94, 96, respectively, extending substantially the height of the chassis. These plates are spaced apart in longitudinal direction, i.e., the direction between the end surfaces 68 and 70. Secured to and between the upright plates 94, 96, is a horizontal plate or deck 98, intermediate the top and bottom of the upright plates, thus forming a recess or cell 100 in the lower portion and a similar recess or cell 102 above it and adjacent the top. The lower recess 100 is utilized for mounting the driving motor 104, which will be referred to again hereinbelow, and the upper recess 102 is utilized for receiving and mounting a battery 106, also referred to again hereinbelow. The motor 104 serving to drive the operating parts mounted on the chassis is an electric motor, and the battery 106 is preferably a dry cell battery of a suitable number of cells, in keeping with the portability of the device.

Secured to the upstanding plate 94 is a top plate 108 extending generally horizontal or parallel with the base plate 56 and reinforced in its mounting by suitable elements 110 serving as braces. Secured to the extended end of the plate 108 is an angle piece 112 having a vertical arm 114 secured directly to the top plate 108 and a horizontal arm 116 positioned substantially parallel with the top plate 108 and the base plate 56. This arm 116 extends longitudinally to a position adjacent to but slightly short of alignment with the corresponding end of the base plate 56, and serves as a means for mounting one of the rolls (85) of the carrier 84.

At the opposite end of the frame, i.e., opposite the arm 116, is an arm or plate 118 secured to the upstanding plate 96, disposed substantially parallel with the base plate 56 and extending substantially in the plane of the arm 116. This plate 118 serves as a means for mounting another roll (87) of the carrier 84, the details of which will be explained hereinbelow.

A front plate 120 (FIG. 6) encloses the main portion of the front side of the frame, and is provided with an aperture 122 for receiving a projecting portion of the circular electric driving motor 104. Preferably also a plate 124 (FIGS. 7 and 10) covers the rear side of the recess 102 in which the battery 106 is disposed. Such plate is removed, except for a small portion, from FIG. 7 for exposing the battery and other elements.

A top closure element, or cap, 126 covers the upper extremities of the various elements of the frame, together with other operating elements, and is secured in place by suitable means such as screws 128 (FIG. 1) to adjacent portions of the frame. The front side of the cap 126 is cut out at 130 (FIG. 1) to accommodate various elements exposed through the front side of the chassis.

The rolls 85 and 87 of the carrier 84 are disposed adjacent the ends of the machine for supporting the belt record medium 76 in the position referred to above. The rolls are spaced longitudinally inwardly a small distance from the ends of the base plate 56 but outwardly of all other elements above the base plate, and particularly beyond the ends of the cap 126. The roll 85 is a driving roll, while the roll 87 is a tension roll, being yieldably movable toward the driving roll 85, in a manner to be explained fully hereinbelow, for facilitating placement of the belt record medium on the roll and removing it therefrom.

The driving roll 85 is made up of two separate portions, namely, a hub portion 132 and a cylinder portion 134 of the same diameter and coaxial therewith. These two portions are mounted on a shaft 136 which in turn is mounted in the rigid frame 92. One end of the shaft is journalled in a bearing in the base plate 56 and the end portion 138 thereat extends beyond the base plate 56 where a driving pulley 140 is mounted for driving the roll. The hub portion 132 is mounted on the shaft 136 for rotation therewith by suitable means such as a screw 142. The hub portion is provided with a series of projections 144 extending radially and distributed around its periphery. These projections are arranged for entering the apertures 90 in the record medium 76 (FIG. 2) for positively driving the record medium in response to rotation of the hub portion 132.

The cylinder portion 134 constitutes the greater length portion of the roll, and is mounted on the shaft 136 for free rotation relative thereto and consequent free rotation relative to the hub portion 132. The opposite end of the shaft 132 is mounted in the arm 116, a suitable bearing 146 being utilized. The hub portion 132 is spaced relative to the base plate 56 so that the apertures 90 in the record medium coincide or register therewith when the record medium is inserted the full extent into the machine. However, spacers 148 (FIG. 6) may be utilized for engagement by the record medium so as to space the apertures to register with the projections 144. In inserting the record medium the user merely so inserts it until it engages a limit stop, and not being able to visually determine when the apertures register with the projections, the limit stop serves to position the record medium so that the apertures do so register.

The tension roll 87, as indicated above, is mounted for yielding movement toward the driving roll 85 to facilitate placement of the record medium on the rolls and removal therefrom. The tension roll 87 is arranged for bodily movement in the direction mentioned, and it is also mounted for limited angular movement to compensate for minor variations in the longitudinal dimensions of the record medium.

Attention is directed particularly to FIGS. 7, 9, 11, 15, 16, 17 and 18 for the means for mounting the tension roll 87. This roll, as indicated above, is mounted in the base plate 56 and the plate 118. The roll includes an integral cylinder portion forming the entire roll, and mounted on a shaft 150 having end portions 152 and 154 mounted in the base plate 56 and plate 118, respectively. Suitable spacing means 155 is interposed between the roll 87 and the base plate 56, while the opposite end of the roll may engage the plate 118, for positioning the roll in axial direction. At each end of the shaft is an assembly of elements, portions of which are mounted for sliding movement in the respective portion of the frame (56 or 118) to provide for movement of the roll. One of these assemblies will be described in detail, it being understood that the assembly at the other end is the same or symmetrical with the first assembly. The assembly at the lower end of the roll and disclosed in FIGS. 9, 15, 16, 17 and 18 will be described. The base plate 56 is provided with a recess or relatively wide groove 156 in its under surface (FIGS. 9 and 18), extending longitudinally of the base plate and receiving a channel element 158 (FIG. 16) having a floor element 160 and an upturned flange 162 on three sides. This channel element is secured in the recess by suitable means such as by screws and the floor element includes a slot 164 receiving the corresponding end portion (152) of the shaft 150. This floor element also includes a notch 166 at one end, i.e., the end without the flange. Slidably mounted in the channel element 158 is a slide 168 (FIG. 15) generally in the form of a plate having an aperture 170 to receive the shaft 150, and a pin 172 for cooperating with a camming means referred to hereinbelow, for effecting sliding movement of the slide 168 and hence the roll. This slide 168 is retained in the channel element 158 by a cover plate 174 (FIGS. 17 and 18) which is fitted thereover and secured in place as by screws 175. The cover plate 174 includes a notch 176 registering with and receiving the pin 172 on the slide 168. However, the end of the shaft 150 is covered by the closure plate 174.

The tension roll 87 is biased to its extended or tensioning position by means of a spring 178 (FIGS. 7, 9 and 11) which is preferably in the form of a leaf spring. This leaf spring is positioned between the tension roll 87 and the adjacent upright plate element 96, and is secured to the latter by screws 180 intermediate the ends of the spring so that the ends are free for biasing movement. The spring is self-biased or prestressed for moving the tension roll 87 to tensioning position, i.e., away from the opposite and driving roll 85 (to the right, FIG. 7). The ends of the spring extend through apertures in the respective frame elements, namely, base plate 56 and plate 118, and extend into the notches 166 in the channel elements 158 at the opposite ends of the roll, and engage the slides 168 and through the latter exert tensioning influence on the roll. It will be recalled that the end portions of the shaft 150 are received in the apertures 170 and upon sliding movement of the slides 168 the roll is moved accordingly. The spring 178 will yield for enabling the roll to be moved bodily as well as angularly, i.e., both ends of the spring will yield together, or either will yield independently of the other.

Means is provided for manually moving the tension roll 87 toward the opposite and driving roll 85, by means of a single manipulable element 182 exposed to the exterior and positioned at one end of the roll. This element is shown on the exterior of the casing of FIG. 1, and it is also shown in FIG. 9. This manipulable element is arranged for cooperation with the assembly just described in connection with FIGS. 9 and 14 to 18, and the chain of elements about to be described acts through the pins 172 (FIG. 15) for moving the slides 168 and thus the roll. Attention is directed particularly to FIGS. 7, 9, and 14. A rock shaft 184, disposed parallel with the roll 87 and adjacent the upstanding plate 96, is journalled for rocking movement in the base plate 56 and plate 118. Mounted on each end of the rock shaft is a lever arm 186, one showing in FIG. 9 and the opposite one in FIG. 11 in dotted line position. This rock shaft is positioned to the side, i.e., laterally offset from the plane containing the axes of the rolls and hence offset from the camming pins 172. These levers or arms 186 are L-shaped, each having one arm portion 188 and a second arm portion 190 disposed approximately at right angles to the first arm portion. The arm portions 188 are provided with half-circular, or other non-circular shaped apertures receiving complementally shaped end portions 192 formed on the ends of the rock shaft 184, for effecting conjoint swinging or rocking movement of the levers and shaft. Suitable clips 194 may be utilized for retaining the levers on the ends of the shaft. These levers are disposed outwardly, or axially, beyond the respective assemblies, which include the cover plates 174 and each arm portion 190 thereof is provided with a camming surface 196 positioned for engaging the respective camming pin 172 (FIGS. 9 and 15) on the slide 168. In response to rocking movement of the shaft 184 in counterclockwise direction (FIGS. 9, 11, and 14) and consequent swinging movement of the levers 186 in the same direction, the arm portions 190 bearing on the pins 172 move the slides 168 from their normal position of FIG. 9 and full line position of FIG. 14, in contracting direction, i.e., toward the opposite driving roll 85, to the dotted line position of FIG. 14. In this movement the surfaces or edges 196 have a slight relative sliding movement over the pins 172 as will be understood. Upon movement of one of the levers 186 (as by moving the element 182—see below), the movement of that lever is transmitted through the rock shaft 184 to the other lever and hence both levers move simultaneously and move the opposite ends of the tension roll 87 simultaneously, thereby to effect bodily movement of the roll.

The manual movement of the tension roll 87, as just described, is effected through the medium of a pin 198 on one of the levers 186, and particularly on the one at the lower end adjacent the manual actuating element 182. This pin is engaged by a cam element 200 having a camming surface 202 directly engages the pin 198 for the purpose mentioned. The cam element 200 constitutes an extension of a cam member 204 which is slidable in a channel element 206 formed on a plate 208. The plate 208 is fitted over the plate 174 (FIGS. 9, 17, and 18) and secured thereto by the same screws 175 utilized for securing the plate 174 in place. The channel element 206 constitutes one edge portion of the plate (see particularly FIGS. 9 and 18) and has an aperture or opening 210 for receiving a stem 212 of the cam member 204 to which the manually actuated element 182 is secured. The securement may be as by a screw 214 which is readily removable for removing the element 182 in removing the chassis from the casing. The cam element 200 includes an additional surface 216 substantially parallel with the line of movement of the cam member for holding the lever 186 in the position to which it is swung, without manually retaining it in such position. An aperture 218 is provided in the casing, and particularly in the bottom closure element 40 for receiving the connecting portions between the element 182 and cam member 204.

The cam member 204 assumes a normal non-camming position shown in FIG. 9 and in full lines in FIG. 14. In such position the levers 186 assume the position shown in FIG. 9 through the action of the spring means 178 (FIGS. 7 and 9) acting through the pin 172. The pin 198 rests in engagement with the camming surface 202. Upon sliding movement of the manually actuated element 182 from the normal position just referred to, in direction toward the opposite and driving roll 85 (to the left in FIG. 9), the inclined camming surface 202 produces a camming action on the pin 198 which swings the adjacent lever 186 to the dotted line position of FIG. 14, as explained above. Swinging movement of this lever rocks the shaft 184 and swings the lever at the opposite end. The tension roll 87 is thus moved to non-tensioning position, i.e., retracted toward the driving roll, for enabling insertion and removal of a record member 76. Upon movement of the cam member 204 the necessary amount, the pin 198 rides up onto the surface 216 as indicated in FIG. 14. This surface being parallel with the direction of movement of the cam member, produces no camming action, but it serves to retain the levers 186 and the rock shaft in the position to which they were swung, as will be understood. Upon manually moving the actuating element 182 in the opposite direction, the spring 178 moves the roll 87 in the opposite direction and the remaining elements to their corresponding normal position.

Attention is next directed to the driving means for driving the roll 85 by the electric motor 104 (FIG. 7). The electric motor 104 is a standard motor operable by dry cell batteries. Appurtenances to the motor are included in the recess or cell 100 but need not be described in view of the standard nature of the motor. The motor 104 is reversible type and is mounted in a suitable manner on and between the base plate 56 and the plate 98. The motor has a drive shaft 220 projected through an aperture in the base plate. A belt 222 is trained on the shaft 220 which serves as a pulley, and on an idler pulley 224 of relatively great diameter and suitably mounted on the lower side of the base plate 56 in a desired manner. The pulley 224 may have a groove 226 for receiving the belt. The pulley 224 has a relatively small diameter shaft-like pulley element 228 drivingly interconnected by means of a belt 230 with the pulley 140 referred to above and mounted on the shaft 136 of the drive roll 85. If desired, a belt tightener 232 of conventional construction may be provided, having a roller 234 engaging the belt and mounted on a pin 236 extended through a slot 238 (FIG. 9) disposed generally transversely of the adjacent run of the belt. The pin 236 is adjustably secured in position by means of nuts 240 engaging opposite surfaces of the base plate. The relative diameters of the shaft 220, pulley 224, shaft 228, and pulley 140, as will be understood, produce a substantial speed reduction drive between the motor and the drive roll 85.

The drive from the motor to the drive roll 85, as just described, is further transmitted to the feed screw 88 for synchronized driving relation between the feed screw and the roll. The means for transmitting the drive to the feed screw includes a pinion 242 on the extension 138 of the shaft of the drive roll and meshing with a gear 244 suitably mounted on a stub shaft 246 secured to the base plate 56. In mesh with the gear 244 is a gear 248 secured to an end shaft portion 250 of the feed screw projecting through the base plate 56. The gear 248 is fixed on the shaft of the feed screw for effecting rotation of the feed screw. However, the feed screw is mounted for limited axial movement, as will be described hereinbelow more fully in connection with the tuning feature of the machine, and to accommodate this axial movement, the gears 244 and 248 are of such axial dimension as to remain fully and efficiently in mesh throughout the axial shifting movement of the feed screw.

The end shaft portion 250 of the feed screw is engaged by the extended end of a leaf spring 252 secured on the base plate 56 as on a pin or stud 254 at the end opposite the end engaging the feed screw. The spring 252 is prestressed for biasing the feed screw axially in one direction (upwardly, FIG. 7) and the feed screw is moved in the opposite direction against the action of the feed spring by manual actuation, as will be described more fully hereinbelow in connection with the tuning feature. In any given setting of the feed screw it remains axially fixed and it is rotated in synchronism with the roll 85, and particularly with the hub portion 132 thereof, in both directions of rotation of the roll. In response to rotation of the feed screw, as explained above, the transducer head 80 is moved along the feed screw in axial direction and thus transversely of the record member.

The transducer head 80 is shown somewhat in detail in FIGS. 7 and 10. The transducer head includes two separate magnetic head members 256 and 258, the former being a recording head and the latter an erasing head. These head members are mounted on a carriage 260 supported on the rod 82 and feed screw 88. The head members 256 and 258 are of conventional nature and need not be described in detail, but briefly are operative for producing or reproducing magnetic signals on the magnetizable material on the record member, and erasing them, respectively. The head member 256 includes a casing 262 and a tracer member 264 arranged in transducing relation to the belt record member 76 as will be seen most clearly in FIG. 10. The head member 256 is mounted on the carriage 260 by suitable means such as a bracket 266. The head member 258 includes a casing 268 and a tracer member 270 arranged in transducing relation to the belt record member 76 in linear alignment with the tracer member 264. This head member is mounted on the carriage 260 by suitable means which may include a mounting bracket 272. The head members 256 and 258 are disposed within the area enclosed by the path of the belt record member, i.e., between the runs of the belt, and thus disposed for transducing relation on the inner surface thereof. The relation between the tracer members 264 and 270 with the belt is such that they preferably engage or substantially engage it, and and the tension of the belt is sufficient for establishing that relation. However, if desired, ribs such as 274, 276 may be formed on the inner surface of the casing 42 for providing nonyielding backing means to the tracer members. Preferably, the surfaces of these ribs are convex so that the engagement with the belt by the tracer members and ribs is essentially of line formation. The friction established by the tracer members and ribs is not so great that the belt record member may not be readily inserted and removed.

The detail construction of the carriage 260 is best shown in FIGS. 7 and 10. The carriage includes a longitudinally extending arm or main portion 278 of sufficient width to support the head members 256 and 258 (FIG. 7) and extending between the support 82 and the feed screw 88. The arm 278 is provided with a fork portion 280 having an open end for receiving the support or rod 82, having elements 282 and 284 on opposite sides of the rod. The elements 282 and 284 engage the rod for sliding movement of the carriage axially therealong and for limited movement in a plane perpendicular to that rod, namely, pivotal movement about the rod as an axis and sliding movement in that plane. At the opposite end of the arm 278 is an end portion 286 to which is secured a member 288 for engaging the feed screw 88 and forming the connection 86 referred to above between the transducer head and the feed screw. The member 288 includes an inclined element 290 of substantial transverse width, i.e., in direction of the axis of the feed screw 88, for engaging the feed screw and riding on the outer extremities of the threads. At the end of the member 288 is a screw follower 292 consisting of axially spaced flanges 294 interconnected by a web 296, the web forming an extension of the element 288 and the flanges forming extremities of the web. The flanges 294 are adapted for entering into spaces between the threads on the feed screw 288 for establishing the driving connection between the feed screw and the transducer head. They are also removable from those spaces to disrupt the driving relation to enable the transducer head to be shifted or moved axially along the feed screw, independently of rotation of the feed screw.

Mounted on the carriage and cooperating with the feed screw is a spring member 298 which forms an extension of a mounting member 300 which includes axially spaced flanges 302 secured to the member 288 and having a web portion 304 interconnecting the flanges. The spring member 298 may form an extension of the web element 304 and is biased or prestressed into engagement with the feed screw and is disposed on the side of the feed screw generally opposite the flanges 294 and the inclined element 290. The prestressed condition of the spring 298 reacting against the feed screw 88 biases or moves the carriage 260 in direction toward the support or rod 82 (to the right in FIG. 10) and brings the flanges 294 into driving engagement with the feed screw. The screw follower 292 and the inclined element 290 are angularly disposed, preferably at substantially right angles, so that each produces a camming action relative to the feed screw, in a respective movement of the carriage. The action of the spring member 298 in moving the carriage in the direction mentioned (to the right, FIG. 10) not only moves the flanges 294 into driving relation with the feed screw, but brings the inclined element 290 also into engagement with the feed screw. The respective end (the left end, FIG. 10) of the carriage is thereby held firmly and stably against play.

The position of the carriage shown in full lines in FIG. 10 is the normal and operative position, being moved to this position by the spring 298. The carriage is moved out of such position, i.e., to the dotted line position of FIG. 10, by means of a bar 306 to be described in detail hereinbelow. Upon actuation of the bar in the appropriate direction (clockwise, FIG. 10), the carriage is moved to its dotted line position. This movement involves pivotal movement about the support or rod 82 as an axis and slight shifting movement of the carriage in a plane perpendicular to the support or rod 82. Swinging movement or pivotal movement of the kind mentioned, namely, depression of the end portion 286 as oriented in FIG. 10, swings the carriage about the axis of the rod 82 and the inclined member 290 in engaging the feed screw 88 cams the carriage to the left (FIG. 10), whereupon the flanges 294 are moved to the left and downwardly out of engagement with the feed screw 88. This combined movement, namely, the swinging and sliding movement, is in opposition to the action of the spring member 298 which biases the carriage in the opposite direction, and upon release of the moving force, namely, upon release of the bar 306, the carriage is moved in the opposite direction under the action of the spring member 298. It will be noted that movement of the elements 282 and 284 relative to the rod 82 enables the swinging and shifting or sliding movement referred to.

When the carriage is in its normal or operative position, the flanges 294 engage the feed screw 88 as stated above, and upon rotation of the latter, the carriage is moved in sliding relation along the feed screw and along the rod 82. When it is moved to the opposite or inoperative position shown in dotted lines in FIG. 10, the carriage may be shifted manually, by means described hereinbelow, rapidly along the feed screw independently of the turning movement of the feed screw, and without operation of any other means except the elements manually manipulated. It will be observed that upon the movements of the carriage 260, as mentioned, the tracer members 264 and 270 are moved slightly inwardly from their outermost operative positions, as indicated in dotted lines in FIG. 10.

Mounted on the arm 278 of the carriage is a bracket 308 secured at one end to the arm and having its opposite end secured to a flexible cable 310, referred to again hereinbelow. The cable serves a dual purpose of operating an indicator in response to movement of the carriage and also as means for manually shifting the carriage. Leading from the transducer head 80 is a flexible conduit 312 (FIG. 7) containing one end portion of an electric cable 314 which is operatively connected with the head members 256 and 258 and with certain control elements in the hand piece 32 (FIG. 1) to be referred to hereinbelow. The cable 314 also includes conductors for connection between the motor 104 and the battery 106 and leads to a connector portion 316 (FIGS. 7 and 9) for connection with the plug 36 (FIG. 5) of the cable 34. The electrical connections are standard connections, as is the connector portion 316 and plug 36, and a detail description thereof is believed unnecessary. The conduit 312 may be in the form of a coil spring anchored at one end to the base plate 56 and at the other end to the carriage, and serving as a means for containing the cable and enabling its effective extension and contraction to accommodate the transverse movement of the transducer head 80 along the rod 82 and feed screw 88, in the transducing operation.

The flexible cable 310 referred to in connection with FIG. 10 is shown in its entirety in FIGS. 6 and 7 and is connected not only with the carriage 260 but also with a pointer 318 (FIGS. 1, 6, 7, and 13). The cable 310 is in the form of an endless belt and is trained over pulleys 319 and 320, and a hand wheel 322, the latter being exposed to the exterior as shown best in FIG. 1, for hand manipulation for adjusting the position of the transducer head 80. The pulley 319 is mounted for rotation on a bracket or block 324 secured to the base plate 56. The pulley 320 is rotatably mounted on a bracket or block 326 secured to the upright plate 96 (FIG. 7) and the wheel 322 is mounted on a block 328 secured to the top plate 108. These pulleys and wheel are arranged in a triangle and so positioned as to form one run of the cable along the path of movement of the transducer head 80 and another run for moving the pointer 318 along a scale 330 (FIGS. 1 and 6) on the front side of the machine. The pointer 318 traverses the scale complementally to the traverse of the transducer head 80 along the feed screw 88. The scale 330 may be in the form of a strip of suitable material fitted in a recess 332 in the front plate 120 mentioned above. It may be secured in any suitable manner such as by fitting it on pins or studs 334 (FIG. 13). The pointer 318 is secured to the cable by suitable means such as disposing the cable in an aperture in the pointer (FIG. 13) and securing the pointer against sliding movement thereon as by a set screw 336. The cable 310 may be fitted in grooves 338 formed in the front plate 120 for positioning the cable in a plane suitable for mounting the pointer 318 and the wheel 322. The upper run of the cable 310 (FIG. 6) may be along the top edge of the front plate 120 and between the plate and the cap 126. The pointer has a portion riding along the top edge of the plate (FIG. 13) and an arm extending downwardly over the front surface of the scale 330.

The wheel 322 is made up of two parts, a central push button member 340 (FIG. 6), and an outer ring 342. The central push button member 340 includes a stub shaft 344 serving as the means for mounting the wheel on the block 328 (FIG. 7). This central push button member is movable to a limited extent axially of the stub shaft through the block 328 for moving the transducer head 80 to the dotted line position of FIG. 10, as described fully hereinbelow. The outer ring member 342 of the wheel is rotatably mounted on the central push button member 340 for rotation relative thereto, and includes a pulley element 346 over which the cable 310 is threaded. Upon movement of the transducer head 80 in the normal transducing operation, i.e., by means of a feed screw 88, the cable 310 is moved along its triangular path by the transducer head and the cable causes rotation of the pulley element 346 and the outer ring 342. Upon release of the driving connection between the transducer head and the feed screw, the transducer head may be shifted along the feed screw and the support 82 (FIG. 7) by manually turning the outer ring 342.

The driving connection between the transducer head 80 and the feed screw 88 is controlled by the wheel 322, i.e., the transducer head is moved to the dotted line position of FIG. 10, by pushing inwardly on the central push button member 340. This movement is transmitted by the stub shaft 344 to a lever 348 which is pivotally mounted intermediate its ends on a pin 350 mounted on the top plate 108 (FIG. 7). One end of the lever 348 is engaged by the shaft 344, as mentioned, and the other end engages the release bar 306 (referred to above). This release bar extends the full distance between the base plate 56 and the top plate 108, and is pivotally mounted therein on an axis extending adjacent one side of the bar, being rockably mounted by pins or studs 352 which may be integral extensions of the bar, disposed in apertures in the base plate and top plate. Upon inward movement or depression of the central push button member 340 and consequent rocking of the lever 348, the bar 306 is rocked about the axis of the ends 352 in clockwise direction (FIG. 10) from the full line position to the dotted line position. This movement of the bar depresses the adjacent end of the carriage 260 to the effect described above in connection therewith. The bar has loose engagement with the carriage and sliding contact therewith, enabling free movement of the carriage or transducer head relative thereto the full length of its normal range of movement, with effective actuation thereof in any position of the carriage or transducer head in response to depression of the central push button 340. Upon such movement of the transducer head or carriage in response to depression of the central push button member 340, the carriage is released from driving connection with the feed screw 88, and then the user may manually rotate the outer ring member 342 which, through the engagement of the cable 310 with the pulley element 346, moves the cable and thereby moves the carriage and transducer head along its path to the desired position.

The tuning feature referred to above comes into play in aligning the transducer head 80 with the signal path on the record medium 76. As explained in the copending applications mentioned above, the transducer head produces a helical signal path or track on the record medium. The record medium moves through its endless path in response to rotation of the rolls 85 and 87, and in the recording operation the transducer head 80 moves in a path transverse to the direction of movement of the record medium, with the result that the path or track of signals formed on the record medium is in the form of a helix. Such track is of a width substantially equal to the width of the tracer member 264, but the convolutions of the track are spaced apart with blank portions therebetween. The spacing of the convolutions may be as desired, and is determined by the ratio of peripheral movement of the driving roll 85 and the feed screw 88. When the record medium is removed from the machine, and later re-inserted therein for transcription purposes, it may be so inserted in a position displaced from its original position a substantial extent linearly about the belt; for example, if the belt should be re-inserted in the machine displaced 180 degrees from the original position, the convolutions of the signal path or track would be displaced laterally a space equal to half of the spacing between adjacent convolutions. For best fidelity in transcription, the tracer member of the pick-up head (tracer member 264) should be perfectly aligned with the track, and if it is displaced therefrom as indicated above, it could not be brought in registry by merely moving the transducer head relative to the feed screw, since the spacing of the threads of the feed screw is somewhat equivalent to the spacing of the adjacent convolutions of the signal path. Hence, provision is made for shifting the feed screw 88 along its axis to bring the transducer head into perfect registration with the signal path. The feed screw is arranged for shifting a distance at least as great as the spacing between the adjacent convolutions in the record medium.

This shifting movement is accomplished through an assembly 354 shown at the upper end of the feed screw (FIG. 7), and includes a tubular member 356 fixedly secured to the top plate 108. This member 356 is internally threaded for receiving the correspondingly externally threaded end portion 358 of a shaft 360, having a button 362 on its outer end and exposed through an aperture in the top plate 363 of the cap 126. The shaft 360 is retained in the tubular member 356 by a set screw 364 engageable by the threads on the shaft for limiting withdrawal of the shaft and also limiting the extent of turning movement thereof. The shaft 360 has a bore 366 receiving a reduced diameter extension 368 of the feed screw. If desired, a bearing ball 370 may be interposed between the reduced portion 368 of the feed screw and the inner end surface of the bore 366. The outer surface of button 362 is exposed to the exterior and has grooves (FIG. 1) or is otherwise formed for producing high friction when engaged by the thumb. The button may be turned by so engaging it with the thumb and turning the thumb in response to which the feed screw is shifted axially. Turning movement of the shaft 360 in appropriate direction threads the threaded portion axially along the tubular member 356 and consequently shifts the feed screw 88 in the same direction, i.e., downwardly as viewed in FIG. 7. This shifting movement is effective against the action of the spring 252 referred to above, and upon turning of the button 362 in the opposite direction and releasing the force of the shaft 360 from the feed screw, the spring 252 returns the feed screw in the opposite direction. The transducer head 80, being in driving engagement with the feed screw, as would normally be the case when the turning operation is effected, is shifted along the support or rod 82 by the feed screw, and since the belt record medium remains stationary, in axial direction, the turning effect as referred to above is accomplished.

The dictating machine of the present invention includes means for totally erasing material previously recorded on the record medium. For this purpose a magnetic erasing bar indicated in its entirety at 372 is employed. This erasing bar is best shown as to its location in the machine in FIGS. 7, 9, and 11, and its detail construction is shown in FIGS. 11 and 19. The erasing bar is positioned adjacent the tension roll 87, and like most of the other operating parts is also contained within the space surrounded by the belt record medium. It extends the full distance of the width of the record medium and is arranged for movement into and out of an erasing position in which the effective elements thereof are substantially in engagement with the inner surface of the record medium.

The erasing bar 372 includes a plurality of permanent magnets 374 (FIG. 19) aligned longitudinally and extending the length of the bar. These permanent magnets, which may be of any suitable type, are spaced apart slightly and held in an assembly by side plates 376 and 378 on opposite sides of and engaging the magnets. The plates 376 and 378 are secured together with the magnets gripped therebetween by securing means in the form of rivets 380 extending through apertures in the plates and the spaces between adjacent magnets. One of the plates, e.g., 378, is extended beyond the magnets in a forward direction and turned over at 382 (FIG. 11) to a position closely adjacent the edge of the other plate 376, forming a gap 384 between the opposed edges of the plates. Preferably the surface of the magnets adjacent the turned over portion 382 is concave, as indicated at 386. The plates or strips 376 and 378 are of magnetic material, whereby to function in the magnetic circuit set up by the magnets. The magnets are magnetized in transverse directions, i.e., the opposite poles are disposed in lines extending between the plates, and hence the polarity of the magnetism in the magnetic circuit through the plates or strips 376 and 378 sets up opposite polarity in the opposed edges defining the gap 384. The magnetic circuit thus established in the strips or plates 376 and 378 is effectively continuous along the length of the erasing bar, notwithstanding the gaps or spaces between the magnets, the strips or plates being continuous in longitudinal direction.

The erasing bar is provided with means for mounting it in position in the machine, which includes a strip 388, which may extend the full length of the bar, if desired, but it may consist merely of an element adjacent each end of the bar. The strip 388 is of non-magnetic material and is gripped in assembly with the erasing bar by means of the rivets 380. The strip extends beyond the erasing bar in the direction opposite the turned over portion 382 and has an arcuate finger 390 partially encircling each of a pair of stub shafts 392 and 394 (FIG. 19) and a finger 396 engaging the respective shaft on the side opposite the arcuate element 390. The stub shafts 392 and 394 serve as a means for rockably mounting the erasing bar in the frame of the machine. The stub shaft 394 may be circular in cross section and is mounted in an aperture in the base plate 56 (FIG. 7). The other stub shaft 392 serves as the means for imparting rocking movement to the erasing bar and hence is provided with a flat surface 398, which is engaged by the straight finger 396 (FIG. 11) so as to secure the shaft and the erasing bar for rocking movement together. The stub shaft 392 is supported in the frame of the machine opposite the base plate 56, namely, it extends through an aperture in the plate 118 and through an aligned aperture in the top element 393 of the cap 126 where a butterfly grip element 400 is secured to it. The handle 400 is pivotally mounted on the end of the stub shaft in the usual way and is pivotally arranged for swinging into a recess 402 so as to be disposed within the exterior contour of the cap 126 when not in use (see also FIGS. 1 and 8). Upon the user raising the butterfly grip element 400 out of the recess and turning it to rock the stub shaft 392, the erasing bar assembly is rocked accordingly, due to the non-turning or fixed connection between the stub shaft 392 and the strip 388 (FIG. 11). The erasing bar assembly assumes an inoperative position shown in full lines in FIG. 11 where it rests against the stop pin 404 secured in a suitable element of the frame such as the plate 118. The erasing bar is biased to its inoperative position by a tension spring 406 secured to the assembly and to a pin 408 secured on an element of the frame. Upon the user turning the grip element 400, as explained above, in the appropriate direction (counterclockwise, FIG. 11), the erasing bar is swung to its operative position or that shown in dotted lines in that figure. In such position the plate 376 and the turned over portion 382, and particularly the opposed edges thereof defining the gap 384, engage or substantially engage the belt record medium. The opposite polarity imposed transversely across this gap produces an erasing operation on previously recorded material, as will be understood. The erasing operation is performed rapidly, the erasing bar being moved to its operative position and the record medium being moved a full cycle through its path.

The compact arrangement of the recording machine includes a novel arrangement for accommodating the battery 106. This battery is of the dry cell type, including a plurality of cells 410. The cells are mounted in a slide 412 whcih is similar to a drawer, removably positioned in the recess or cell 102 referred to above, and shown best in FIG. 7. The slide 412, when considered as a drawer, includes a bottom member 414 (FIGS. 7, 10, and 13), an inner end wall 416 (FIG. 7), side walls 418 (FIG. 7), and an outer wall 420. The slide or drawer is insertable into and removable through an opening 422 in the top element 393 of the cap 126 (FIGS. 1 and 7). The outer wall 420 includes a plate which, when the slide or drawer is in inserted position, is flush with the top element 393 of the cap, as shown best in FIGS. 1 and 7. The various elements of the slide or drawer are provided with contact terminal elements 424 for engagement by the terminals of the battery cells, and connected by suitable and well-known means to terminal elements 426 having portions exposed through the front wall 416 and in position for engagement with spring contact terminal elements 428. The elements 428 are mounted on the longitudinal plate or deck 98 by suitable means, insulation material 430 being interposed. The contact terminal elements 428 have electrical contact engagement with the corresponding elements of the electric motor 104 through various conductors under the control of control elements contained in the hand piece or microphone unit 32 (FIG. 1) and indicated in the diagrams of FIGS. 21 and 22. The slide or drawer 412 preferably has its top side open to facilitate removal and replacement of the battery cells, but the latter are retained in place by the plate 124 when the slide or drawer is in the recess 102.

Latch means for releasably retaining the slide or drawer in place is shown in FIG. 13. The slide or drawer includes an element 432 adjacent or engaging the inner surface of the front plate 120 and having an aperture 434 for releasably receiving a pin 436. The pin 436 is mounted on the swinging end of a spring blade 438 secured at its opposite end to the front plate 120 and having a push button 440 intermediate its ends projecting through an aperture 442 in the front plate 120. This push button 440 is also shown in FIGS. 1 and 6. Upon depression of the push button the spring blade 438 is swung inwardly which draws the pin 436 out of the aperture 434, and the slide or drawer 412 is then readily removable. The machine may be turned over to facilitate ejection of the drawer, but also the spring contact terminal elements 428 (FIG. 7) may be utilized for moving the slide or drawer slightly outwardly or upwardly, sufficiently to enable the user to grip the front plate 420 by the fingers and thereby withdraw the slide.

Figure 22:
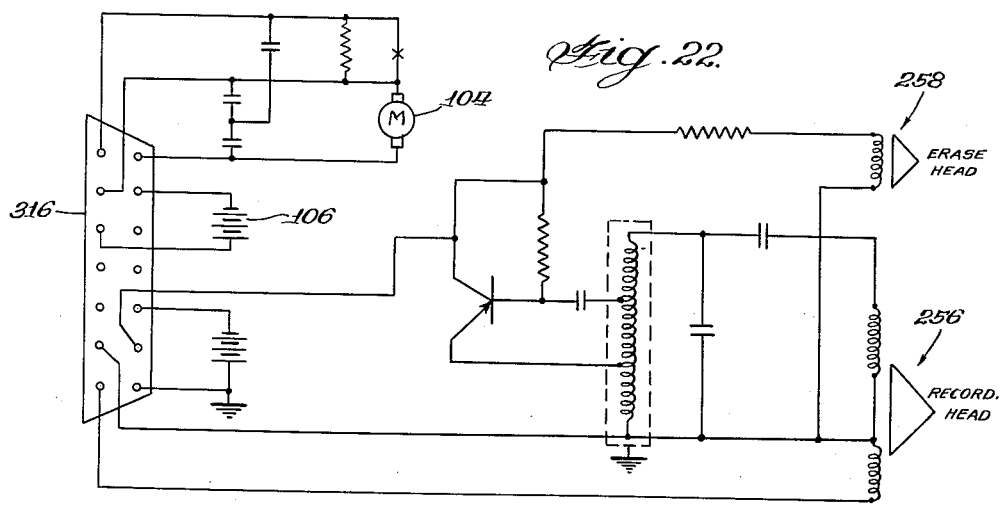
FIG. 22 is a diagram of another circuit portion used in the machine.

Attention is next directed to the hand piece 32 and the electrical control elements therein, in particular relation to FIGS. 20, 21, and 22. All of the electrical controls for the machine are contained in the hand piece 32 including an amplifier, speaker, microphone, switches for controlling the electric motor 104 as well as the elements of the transducer head 80, and the volume control. The hand piece 32 includes a backing plate 444 and a cover or enclosing shield-like member 446. FIG. 20 shows the interior of the hand piece where a microphone and speaker 448 of conventional construction is mounted. The cover member 446 is provided with a screen 450 covering the microphone and speaker for the usual purpose. Also contained within the hand piece is a volume control means including a hand manipulable member 452 exposed to the exterior as shown in FIG. 1. Other control elements and electrical appurtenances are contained in the hand piece as shown in FIG. 20 and include transistors which, because of their small size, enable a compact arrangement while providing suitable amplification.

Means is provided in the microphone unit 32 for controlling the functioning of the record medium 76 in the machine unit 30. In a dictating or recording operation, the recording head member 256 is conditioned for magnetizing the record medium and in the recording operation the erasing head 258 performs an erasing operation. These transducer head members are so conditioned by switch means indicated in its entirety at 454, but which are also utilized in connection with other control functions. The switch means for controlling the transducer head members include a push button 456 (FIG. 1) exposed to the exterior, and upon depression of this switch button, the switch means 454 is connected in circuit to energize the recording and erasing heads, energize the motor, and the microphone. Included also in the switch means 454 are control elements for reversing the direction of drive of the motor 104. This is under control of a push button 458 also mounted in the hand piece 32 and exposed to the exterior (FIG. 1). In the reversing operation the motor is driven in reverse direction, but the transducer head members 256 and 258, and consequently the microphone-speaker, are de-energized.

The switch means 454 includes additionally, the switch control means for the listening or playing back operation, and includes a push button 460 similarly mounted in the hand piece 32 and exposed to the exterior. Upon depression of this switch button 460, switching control functions are performed for driving the motor 104 in forward direction. The recording head member 256 is energized for picking up the signals previously recorded on the record member and transmitting them to the speaker 448 which is similarly energized.

The control elements contained in the hand piece 32 are indicated in the diagram of FIG. 21. Included in this circuit diagram is a conventional amplifier 462 of push-pull type connected in circuit with the switch means 454. The switch means 454, as will be understood, include a plurality of contact elements 462 arranged for engagement in various permutations by bars 464 under the control of the switch buttons 456, 458, and 460. The circuit portion including the switch means 454 may lead to and terminate in a connector element 466 (FIG. 21) contained in the hand piece 32 and connectible with a counterpart connector element 468 in the cable 34 (FIG. 1). At the opposite end of the cable 34 is the connector part or plug 36 referred to above (FIG. 1), detachably connectible with the connector part 316 (FIG. 22) referred to above (FIG. 9). The latter connector part is contained in the machine unit 30 and exposed through the opening 38 in the bottom member 40 thereof. The circuit portion of FIG. 22 is that contained in the machine unit 20 and, as will be seen, includes the motor 104, battery 106, transducer head members 256 and 258, as well as other elements in the circuit.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A recording machine comprising a frame, a pair of spaced rolls mounted on the frame for supporting a belt record medium thereon, said rolls including a drive roll, said drive roll including a hub portion at one end and an additional cylindrical portion extending from the hub portion and mounted for free rotation relative to the hub portion, driving means, drive transmitting means interconnecting the driving means and said hub portion of the roll, said hub portion having driving relation with a belt record medium on the roll, a transducer mounted on the frame for effective engagement with a belt record medium supported on the rolls and for movement transversely thereof, and drive transmitting means interconnecting the driving means and transducer.

2. In combination, a record medium in the form of an endless belt having substantial transverse dimension and having a series of apertures extending linearly therearound and positioned adjacent one edge thereof, a recording machine including a casing and a chassis therein, the casing having a continuous surrounding wall, a bottom side and an open top side, the chassis being secured in the casing adjacent said bottom side and having spaced parallel rolls extending upwardly and terminating adjacent the open top of the casing, said belt being supported on said rolls and the rolls being so relatively spaced and the rolls and casing being so dimensioned that they define a thin path therebetween receiving said belt, one of said rolls being a driving roll and including a hub portion adjacent the bottom with a series of radial projections distributed therearound and an additional main cylindrical smooth portion extending upwardly from the hub portion rotatable relative thereto, the chassis including means engageable by the belt for limiting insertion of the belt through the open top of the casing to a position in which the apertures therein are in alignment, in direction of movement of the belt, with said projections, transducer means mounted on the chassis for movement relative to the belt, and means for driving the driving roll and transducer means.

3. A recording machine comprising a frame, a pair of spaced parallel rolls mounted on the frame, one of said rolls being a tension roll and supported at both ends and having sliding engagement with the frame for bodily sliding movement toward and from the other roll in a single plane containing the axes of the rolls, means biasing the tension roll away from the other roll, manually actuatable means for moving the tension roll toward the other roll including elements engaging the roll at both ends and an element for engagement by the hand axially beyond the roll, the portion of said actuatable means that is within the axial limits of the roll being also within the space encompassed by a belt mounted on the rolls, and transducer means mounted on the frame in operative relation to a belt record medium mounted on the rolls.

4. A recording machine comprising a frame, a pair of rolls mounted on the frame for supporting an endless belt thereon, one of the rolls being a tension roll and movable bodily toward and from the other roll in a single plane containing the axes of the two rolls, means biasing the rolls relatively apart, and means for manually moving the tension roll toward the other roll including a shaft mounted in the frame at a position generally between the rolls for limited rocking movement, arms mounted at the ends of the shaft, means establishing effective engagement between said arms and the end portions of the tension roll, and manually actuatable means mounted on the frame and effectively engageable with said rock shaft and movable between limit positions on the frame and operative in response to movement in one direction between said limit positions for rocking said shaft and thereby swinging said arms and moving the tension roll toward the other roll.

5. A machine of the character disclosed comprising a frame, a pair of spaced parallel rolls mounted on the frame for supporting an endless belt record medium thereon, one of said rolls being a tension roll and supported at both ends on said frame and movable thereon toward and from the other roll in a single plane containing the axes of the two rolls, said tension roll having shaft elements extending axially beyond the roll and constituting means for mounting the roll on the frame, a rock shaft parallel with the tension roll and disposed generally between the rolls, an arm mounted on each end of the rock shaft, actuating members between the end portions of the shaft and said arms, said arms being operative on swinging movement thereof in response to rocking of the rock shaft for engaging said actuating elements and moving the tension roll toward the other roll, means biasing the rolls relatively apart, and a manually actuatable element for rocking said rock shaft including an element mounted on the frame for sliding movement in directions parallel with the plane containing the axes of the rolls, cam means on one of said arms and the manually manipulable element operative in response to sliding movement of the manually manipulable element in one direction for swinging said one arm and thereby rocking the rock shaft and similarly swinging the opposite arm in direction for moving the tension roll toward the other roll to a retracted position, said cam means having a flat portion enabling a stable condition with the tension roll in said retracted position when so moved toward the other roll.

6. A machine of the character disclosed comprising a frame, a pair of spaced parallel rolls mounted thereon for supporting an endless belt record medium, one of said rolls being a tension roll and having shaft elements extending beyond the ends thereof, said frame including elements for mounting said tension roll at both ends, a slide associated with each end of the tension roll and receiving the respective shaft portion of the roll, means mounting the slides on said frame elements for sliding movement thereon for moving the tension roll bodily toward and from the other roll, said slides having actuating pins thereon, means biasing the tension roll away from the other roll including a leaf spring secured to the frame at a position intermediate its ends and having its end portions engaging said slides, a rock shaft mounted in the frame at a position generally between the rolls and displaced from said actuating pins in a direction perpendicular to the plane containing the axes of the rolls, an L-shaped arm mounted on each end of said rock shaft and having a surface generally transversely of said plane engaging the respective actuating pins, and a manually actuated element including a member mounted on said frame for sliding movement in directions generally between said axes, said sliding member and one of said L-shaped arms having inter-engaging cam means operative in response to sliding movement of said member in one direction for swinging the associated arm and thereby the rock shaft and the arm at the opposite end in directions for engaging the actuating pins and thereby moving the said slides and the tension roll toward the other roll.

7. A recording machine of the character disclosed comprising in combination a frame, a pair of spaced parallel rolls mounted on the frame, an endless belt record medium mounted on said rolls and having a magnetizable material on its inner surface, an erasing bar mounted on the frame at a position generally between said rolls and within those portions of the belt extending between the rolls, said erasing bar being mounted for swinging movement on an axis parallel with the axes of the rolls and swingable about its said axis into and out of an operative position, said erasing bar extending at least throughout the width of the belt and, when in said operative position, being substantially in engagement with said inner surface of the belt and the magnetizable material thereon, said erasing bar including magnetic elements which when engaging the magnetizable material as stated, effect an erasing operation of recorded signals on the magnetizable material.

8. A transducer and mounting means therefor comprising a rod and feed screw disposed in parallel and spaced relation, a transducer including a carriage having an opening slidably receiving the rod and the carriage supportingly engaging the rod, an edge element engaging the threads of the feed screw, and spring means mounted on the support and engaging the feed screw and biasing the carriage in direction for causing the edge element to engage the threads of the feed screw, and the carriage being movable against the action of the spring for detaching the edge element from the threads of the feed screw and enabling the carriage to be moved freely along the rod and feed screw in axial direction.

9. A transducer assembly comprising a rod and feed screw disposed in parallel and spaced relation, a transducer, a carriage having an end slidably engaging the rod, an edge element on the carriage engaging the threads of the feed screw, and spring means mounted on the carriage and engaging the feed screw and biasing the carriage in direction for causing the edge element to engage the threads of the feed screw, and the carriage being movable against the action of the spring for detaching the edge element from the threads of the feed screw and enabling the carriage to be moved axially along the rod and feed screw, said spring being in the form of a leaf spring, and the leaf spring, and said end of the carriage having flat surfaces engaging respectively the feed screw and rod throughout a substantial axial distance whereby to retain the carriage in perpendicular and non-binding relation to the feed screw and rod.

10. A recording machine comprising a frame, a pair of rolls mounted on the frame for supporting a belt, such a belt when so supported lying in a path around the rolls with runs between the rolls, a rod and feed screw mounted on the frame between said runs of the belt path in spaced apart relation and parallel with the axes of the rolls, a transducer assembly mounted on the feed screw and rod for movement therealong and hence in direction transversely of the belt path, the transducer assembly including a forked element at a first end receiving and engaging the rod for sliding movement along the rod and limited movement transversely of the rod, an edge element on the opposite and second end of the assembly, an inclined element at the second end of the assembly engageable with the feed screw, the inclined element and edge element being so positioned that the edge element moves into and out of operative position in engagement with the threads of the feed screw in response to swinging movement of the second end of the assembly about the axis of the rod, a spring secured to the assembly adjacent the second end thereof engaging the feed screw and effective for biasing the assembly into operative position, means operative for swinging the assembly out of operative position including a hand manipulative element disposed beyond the belt path axially of the rolls and accessible to the exterior, and means for driving one of the rolls and the feed screw.

11. A recording machine comprising a frame, a pair of rolls mounted on the frame for supporting a belt, such a belt when so supported lying in a path around the rolls with runs between the rolls, a rod and a feed screw mounted on the frame between said runs of the belt path in spaced apart relation and parallel with the axes of the rolls, a transducer assembly mounted on the feed screw and rod for movement therealong and hence in direction transversely of the belt path, the assembly including a forked element at a first end receiving and engaging the rod for sliding movement along the rod and limited swinging movement about the rod as an axis, an edge element on the opposite and second end of the assembly, an inclined element at the second end of the assembly engageable with the feed screw, the inclined element and edge element being so positioned that the edge element moves into and out of operative position in engagement with the threads of the feed screw in response to swinging movement of the second end of the support about the axis of the rod, a spring secured to the assembly adjacent the second end thereof engaging the feed screw and effective for biasing the assembly into operative position, a bar mounted in the frame in relative sliding engagement with the second end of the assembly and pivoted on an axis parallel with the feed screw and operative on rocking movement thereof about its pivotal axis for swinging the assembly out of operative position, a push button on the frame and manually accessible beyond the belt path axially of the rolls, means interconnecting the push button and bar for rocking the bar pursuant to depression of the push button, and means for driving one of the rolls and the feed screw.

12. A recording machine comprising a frame, means for mounting a belt record medium for movement in an endless path, a casing enclosing the foregoing parts and in close proximity to the belt path exteriorly thereof, a transducer within the belt path and having pole tips disposed for operative engagement with a belt in the path, the casing having an internal rib opposed to the pole tips and effective as a backing member thereto with a belt in said path engaged therebetween, and means for driving the belt mounting means and for moving the transducer relative to the belt.

13. A recording machine comprising a frame, means for mounting a belt record medium and for driving it through an endless path, a transducer within the belt path in operative position relative to a belt so mounted, means mounting the transducer for movement transversely of the belt path whereby to form a helical signal path along the belt made up of transversely spaced convolutions, an axially shiftable feed screw operatively connected with the transducer for moving the latter transversely as stated, means extending axially of the feed screw and beyond the belt path and having an end surface transverse to its axis and exposed to the exterior for engagement by the hand and manipulable thereby for shifting the feed screw axially an amount at least as great as the spacing between adjacent convolutions in the signal path, and means for rotating the feed screw.

14. A machine of the character disclosed, comprising a frame, means for mounting a belt record medium on the frame for movement in an endless path, the frame having a portion extending laterally beyond said path, a transducer mounted on the frame within said path for movement transversely of the path, a feed screw within said path, means for driving the feed screw, means forming a driving connection between the feed screw and transducer, means biasing the parts of said driving connection to operative condition, a scale on the extended portion of the frame, a pointer mounted on the frame for movement along said scale, an endless cable connected to the transducer and pointer for moving the latter along the scale in response to movement of the transducer along the feed screw, means for mounting said endless cable including a wheel mounted on said extended portion of the frame and accessible to the hand for manipulation thereby, and means on said extended portion of the frame for manually releasing the driving connection between the feed screw and transducer.

15. A recording machine comprising, a frame, means for mounting a belt record medium on the frame for movement in an endless path disposed adjacent the respective transverse limits of the frame, a motor for driving the record medium mounting means and disposed within said path, said frame having a recess opening therefrom in direction axially of the belt record medium, a slide movably mounted in said recess, a battery in said slide, means in said slide forming contact terminals electrically engaging said battery and exposed to the exterior of the slide, and means in the frame forming contact elements electrically interconnecting the first mentioned contact elements and the motor.

16. A recording machine combination comprising a machine unit and a microphone unit, an electric cable detachably interconnecting the units, the machine unit including a frame, a pair of rolls mounted on the frame for supporting a magnetic record medium, one of the rolls being movable toward and from the other, manually actuatable means for effecting movement of said one of the rolls, a transducer mounted on the frame for cooperation with the record medium and movement transversely thereof, a feed screw for so moving the transducer, manually actuatable means for axially shifting the feed screw, manually actuatable means for releasing the transducer from the feed screw and moving it independently of the feed screw, an elastic motor on the frame for driving one of the rolls and the feed screw, a magnetic erasing bar movable into and out of an erasing position relative to the path of a record medium on the rolls, manually actuatable means for effecting movement of the erasing bar, the foregoing manually actuatable means constituting the mechanical control means for the machine and being included in the machine unit and accessible from the exterior, the microphone unit including all of the electrical controls and elements hereinafter stated, a microphone-speaker, amplifier means, a transistor electrical control circuit for the transducer and microphone-speaker, switch means for controlling the transducer, motor and microphone-speaker, and volume control means for the amplifier means.

17. A machine of the character disclosed, comprising a frame, a pair of spaced parallel rolls mounted on the frame for supporting a belt, a transducer mounted in the space surrounded by a belt when so supported on the rolls and having pole tips substantially engaging the belt, an electric motor, fixed driving means connecting the electric motor and at least one of the rolls for driving the latter and thus driving the belt in an endless path and for driving the transducer transversely of the belt, said electric motor being reversible for driving the rolls and a belt thereon in either of opposite directions, and a battery for energizing the electric motor, the driving means and battery being contained substantially within the axial projection of the belt.

References Cited in the file of this patent

UNITED STATES PATENTS

| | | |
|---|---|---|
| 2,732,437 | Travis | Jan. 24, 1956 |
| 2,766,328 | Handschin et al. | Oct. 9, 1956 |
| 2,831,068 | Boggs | Apr. 15, 1958 |
| 2,847,223 | Taylor et al. | Aug. 12, 1958 |
| 2,870,265 | Vermeulen | Jan. 20, 1959 |
| 2,880,280 | Gernert et al. | Mar. 31, 1959 |
| 2,900,191 | Roberts | Aug. 18, 1959 |
| 2,926,920 | Lorenz | Mar. 1, 1960 |
| 2,935,370 | Fritzinger | May 3, 1960 |
| 2,975,239 | Jackson | Mar. 14, 1961 |

UNITED STATES PATENT OFFICE
CERTIFICATE OF CORRECTION

Patent No. 3,060,278                         October 23, 1962

George F. Parris

It is hereby certified that error appears in the above numbered patent requiring correction and that the said Letters Patent should read as corrected below.

Column 2, line 22, for "he" read -- the --; column 8, line 39, after "202" insert -- which --; line 64, for "pin", first occurrence, read -- pins --; column 10, line 6, for "screew" read -- screw --; line 27, strike out "and", second occurrence, column 14, lines 27 and 30, for "turning", each occurrence, read -- tuning --; column 15, line 59, for "whcih" read -- which --; column 17, line 30, for "20" read -- 30 --; column 22, line 7, for "elastic" read -- electric --.

Signed and sealed this 16th day of April 1963.

(SEAL)
Attest:

ERNEST W. SWIDER
Attesting Officer

DAVID L. LADD
Commissioner of Patents